US008572591B2

(12) United States Patent  
Cwalina et al.

(10) Patent No.: US 8,572,591 B2
(45) Date of Patent: Oct. 29, 2013

(54) DYNAMIC ADAPTIVE PROGRAMMING

(75) Inventors: Krzysztof Janusz Cwalina, Sammamish, WA (US); Westley Haggard, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/816,249

(22) Filed: Jun. 15, 2010

(65) Prior Publication Data

US 2011/0307869 A1  Dec. 15, 2011

(51) Int. Cl.
*G06F 9/45* (2006.01)

(52) U.S. Cl.
USPC .......................................................... 717/147

(58) Field of Classification Search
USPC ......... 717/136, 162, 100, 104, 108, 115, 140, 717/164, 147; 709/217–223, 200, 225, 202, 709/230; 725/81; 707/1

See application file for complete search history.

(56) References Cited

U.S. PATENT DOCUMENTS

| 5,485,615 | A  | 1/1996  | Wennmyr |
| 5,500,881 | A  | 3/1996  | Levin |
| 5,579,518 | A  | 11/1996 | Yasumatsu |
| 5,687,377 | A  | 11/1997 | Pasquariello |
| 5,692,195 | A  | 11/1997 | Conner |
| 5,696,974 | A  | 12/1997 | Agrawal |
| 5,742,828 | A  | 4/1998  | Canady |
| 5,748,961 | A  | 5/1998  | Hanna |
| 5,748,963 | A  | 5/1998  | Orr |
| 5,842,220 | A  | 11/1998 | De Groot et al. |
| 5,872,973 | A  | 2/1999  | Mitchell |
| 5,983,021 | A  | 11/1999 | Mitrovic |
| 6,018,628 | A  | 1/2000  | Stoutamire |
| 6,023,583 | A  | 2/2000  | Honda |
| 6,041,179 | A  | 3/2000  | Bacon |
| 6,041,180 | A  | 3/2000  | Perks et al. |
| 6,072,950 | A  | 6/2000  | Steensgaard |
| 6,100,885 | A  | 8/2000  | Donnelly et al. |
| 6,126,330 | A  | 10/2000 | Knight |
| 6,134,708 | A  | 10/2000 | Yui |
| 6,237,135 | B1 | 5/2001  | Timbol |
| 6,330,717 | B1 | 12/2001 | Raverdy |
| 6,415,316 | B1 | 7/2002  | Van der Meer |
| 6,425,124 | B1 | 7/2002  | Tominaga |
| 6,477,543 | B1 * | 11/2002 | Huang et al. ........................ 1/1 |
| 6,560,774 | B1 | 5/2003  | Gordon |
| 6,678,745 | B1 | 1/2004  | Hodge |
| 6,785,880 | B1 | 8/2004  | Beisiegel et al. |
| 6,842,877 | B2 | 1/2005  | Robarts |
| 6,915,301 | B2 | 7/2005  | Hirsch |
| 6,928,425 | B2 | 8/2005  | Grefenstette |

(Continued)

OTHER PUBLICATIONS

C. Enrique Ortiz, Using the PIM API for Java ME, Part 2—Portability Considerations, http://developers.sun.com/mobility/apis/pim/pim2/, 3 Pages, Published Mar. 2007.

(Continued)

*Primary Examiner* — Tuan A Vu
(74) *Attorney, Agent, or Firm* — Workman Nydegger

(57) ABSTRACT

Creating and executing platform portable code. A method includes declaring an object as being a dynamic object in a program. The program is a program compiled using a static language, except that the dynamic object is excluded from static analysis on the object when the program is compiled. The dynamic object includes a dependent call to a platform specific API. The platform specific API is available on one or more platforms to which a compiled version of the program will be deployed, but not available on one or more other platforms to which the compiled version of the program will be deployed.

20 Claims, 5 Drawing Sheets

(56) References Cited

U.S. PATENT DOCUMENTS

| | | |
|---|---|---|
| 6,957,394 B1 | 10/2005 | Fernandez |
| 6,973,646 B1 | 12/2005 | Bordawekar |
| 6,981,249 B1 | 12/2005 | Knoblock et al. |
| 6,986,132 B1 | 1/2006 | Schwabe |
| 7,017,117 B2 | 3/2006 | Capps |
| 7,051,322 B2 | 5/2006 | Rioux |
| 7,120,897 B2 | 10/2006 | Ebbo |
| 7,127,707 B1 | 10/2006 | Mishra |
| 7,137,069 B2 | 11/2006 | Abbott |
| 7,152,229 B2 | 12/2006 | Chong |
| 7,197,702 B2 | 3/2007 | Niyogi |
| 7,246,361 B1 | 7/2007 | Scalora |
| 7,389,498 B2 | 6/2008 | Meijer |
| 7,730,448 B2 | 6/2010 | Meijer |
| 7,818,729 B1 | 10/2010 | Plum et al. |
| 7,958,493 B2 | 6/2011 | Lindsey |
| 2002/0016953 A1 | 2/2002 | Sollich |
| 2002/0095657 A1 | 7/2002 | Vaidyanathan |
| 2002/0095658 A1 | 7/2002 | Shulman |
| 2002/0129345 A1 | 9/2002 | Tilden et al. |
| 2003/0023957 A1 | 1/2003 | Bau |
| 2003/0079199 A1 | 4/2003 | Barsness |
| 2003/0097648 A1 | 5/2003 | Allison |
| 2003/0131347 A1 | 7/2003 | Allison |
| 2004/0098731 A1 | 5/2004 | Demsey |
| 2005/0004973 A1 | 1/2005 | Snover |
| 2005/0081139 A1 | 4/2005 | Witwer |
| 2005/0086360 A1 | 4/2005 | Mamou |
| 2005/0091531 A1 | 4/2005 | Snover |
| 2005/0097611 A1* | 5/2005 | Kim .................................. 725/81 |
| 2005/0114771 A1 | 5/2005 | Piehler |
| 2005/0198177 A1 | 9/2005 | Black |
| 2005/0278695 A1 | 12/2005 | Synovic |
| 2006/0015817 A1 | 1/2006 | Fioretti |
| 2006/0026559 A1 | 2/2006 | Gunturi |
| 2006/0031263 A1 | 2/2006 | Arrouye |
| 2006/0100975 A1* | 5/2006 | McMaster et al. ................. 707/1 |
| 2006/0173911 A1 | 8/2006 | Levin |
| 2006/0206391 A1 | 9/2006 | Delson |
| 2007/0055978 A1 | 3/2007 | Meijer |
| 2007/0100967 A1* | 5/2007 | Smith et al. .................... 709/219 |
| 2007/0168940 A1* | 7/2007 | Lunawat ........................ 717/108 |
| 2007/0234322 A1 | 10/2007 | Palacz |
| 2007/0240120 A1 | 10/2007 | Miller |
| 2007/0256060 A1 | 11/2007 | Ryu |
| 2008/0178151 A1* | 7/2008 | Chan et al. .................... 717/115 |
| 2008/0320444 A1* | 12/2008 | Meijer et al. .................. 717/110 |
| 2008/0320453 A1 | 12/2008 | Meijer |

OTHER PUBLICATIONS

Pramod G. Joisha, et al., Efficiently Adapting Java Binaries in Limited Memory Contexts, http://www.hpl.hp.com/personal/Pramod_Joisha/Publications/ijpp.pdf, 22 Pages, Retrieved Apr. 17, 2010.

Doug Tillman, Write Adaptive, Dynamic Code Using Reflection, http://www.devx.com/Java/Article/27798/1954, 3 Pages, Retrieved Apr. 17, 2010.

Java.awt Class Desktop, http://java.sun.com/javase/7/docs/api/java/awt/Desktop.html#isSupported(java.awt.Desktop.Action), 6 Pages, Retrieved Apr. 17, 2010.

DynamicObject Members, http://msdn.microsoft.com/en-us/library/system.dynamic.dynamicobject_members.aspx, 3 Pages, Retrieved Apr. 17, 2010.

Wright, et al., "A Practical Soft Type System for Scheme", 1994, ACM, p. 250-262.

Pnizzi, et al., "On the Return Types of Virtual Functions", 1999, ACM, p. 37-42.

Stan Schultus. "Language Enhancements in Visual Basic 2005". Oct. 2004. http://msdn2.microsoft.com/en-us/library/ms379584(vs.80).aspx. (14 pages).

Andy D. Pimentel. "A Case for Visualization-integrated System-level Design Space Exploration" (10 pages). Available at least as early as Dec. 31, 2005.

eWay Ltd, http://www.eway.co.uk/interdevtricks.html#IntellisenseWorkarounds., available at least as early as Dec. 31, 2000. (3 pages).

Author Unknown, Theme Development, http://codex.wordpress.org/User:JPAUL/Theme_Development, Available at least as early as Mar. 30, 2007 (12 pages).

Ravikumar Raja, "Themes in ASP.NET 2.0.", Aug. 26, 2006 (14 pages).

Fritz Henglein, "Efficient Type Inference for Higher Order Binding-Time Analysis", May 1991, FPCA conference, pp. 1-23 <Henglein91.pdf>.

U.S. Appl. No. 11/766,347, Apr. 3, 2012, Office Action.
U.S. Appl. No. 11/201,507, Sep. 3, 2008, Office Action.
U.S. Appl. No. 11/201,507, Mar. 23, 2009, Office Action.
U.S. Appl. No. 11/201,507, Feb. 22, 2010, Notice of Allowance.
U.S. Appl. No. 11/220,167, Feb. 6, 2009, Office Action.
U.S. Appl. No. 11/220,167, Aug. 7, 2009, Office Action.
U.S. Appl. No. 11/220,167, Jan. 20, 2010, Office Action.
U.S. Appl. No. 11/220,167, Jul. 7, 2010, Office Action.
U.S. Appl. No. 11/766,345, Mar. 1, 2012, Office Action.
U.S. Appl. No. 11/766,345, Aug. 2, 2012, Office Action.
U.S. Appl. No. 11/766,347, Sep. 19, 2012, Notice of Allowance.
U.S. Appl. No. 11/220,167, Oct. 22, 2012, Office Action.
U.S. Appl. No. 11/766,345, Nov. 26, 2012, Office Action.
U.S. Appl. No. 11/220,167, Mar. 1, 2013, Notice of Allowance.
U.S. Appl. No. 10/972,871, Feb. 27, 2007, Office Action.
U.S. Appl. No. 10/972,871, Sep. 12, 2007, Office Action.
U.S. Appl. No. 10/972,871, Dec. 14, 2007, Office Action.
U.S. Appl. No. 10/972,871, Jul. 15, 2008, Office Action.
U.S. Appl. No. 10/972,871, Dec. 26, 2008, Office Action.
U.S. Appl. No. 10/972,871, May 13, 2009, Office Action.
Office Action dated May 30, 2013 cited in U.S. Appl. No. 11/766,345.
U.S. Appl. No. 13/926,074, filed Jun. 25, 2013, Meijer.

* cited by examiner

DYNAMIC ADAPTIVE PROGRAMMING

BACKGROUND

Background and Relevant Art

Computers and computing systems have affected nearly every aspect of modern living. Computers are generally involved in work, recreation, healthcare, transportation, entertainment, household management, etc.

Portable programs (i.e. programs that can run on multiple platforms) often need to execute platform specific instructions when they run on a particular platform. Different platforms represent differences in environments or underlying systems where software is run and may be characterized by being or having different devices, different operating systems or even different versions of the same operating system. Portable programs distributed as source code can accomplish this quite easily with #ifdefs, for example. An #ifdef is a marker for the compiler. A developer supplies multiple versions of instructions for the different platforms. The compiler determines the platform and selects the code appropriate for the platform from among the multiple versions. The selected code is then compiled to a binary. #ifdefs result in a single source code document and multiple compiled binaries.

However, it is much harder to execute such platform specific instructions when the binary needs to be portable. This is especially true for statically compiled languages and runtimes with load time verification. Statically compiled languages are languages that try to detect programming errors at compile time. If a developer attempts to include multiple versions of instructions, errors will result as all but one of the versions will be flagged by the compiler as errors. In particular, compilers typically generate platform specific binaries and will detect code written for other platforms as errors. Similarly, load time verification systems will attempt to, at runtime, check code for errors. Versions of code for other platforms will be detected as errors. These languages and runtimes often need to provide abstractions that are present in all the target platforms by using a platform adaptation layer (PAL), even if some of the platforms do not support meaningful implementations of these abstractions. PALs may use object oriented inheritance to prevent errors from being detected. In particular, different libraries are loaded at different platforms such that code versions that will not work for a particular platform are not deployed to that platform and as such, there is no inappropriate calls to platform specific APIs. PALs are complicated to implement, in that developers need to ensure inheritances are appropriate and libraries are deployed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of creating platform portable code. The method includes declaring an object as being a dynamic object in a program. The program is a program compiled using a static language that supports dynamic calls. Declaring the object as being a dynamic object causes the object declared as being a dynamic object to be excluded from static analysis on the object when the program is compiled. The dynamic object includes a dependent call to a platform specific API. The platform specific API is available on one or more platforms to which a compiled version of the program will be deployed, but not available on one or more other platforms to which the compiled version of the program will be deployed. The method further includes statically compiling the program to platform portable code. The platform portable code is then deployed to, and successfully executed on, different platforms. Statically compiling the program to platform portable code includes excluding the dynamic object, as a result of the object being declared as a dynamic object, from static analysis performed on other objects not declared as dynamic in the program during compiling.

Another embodiment includes a method of executing platform portable code. The method includes accessing a dynamic object included in a compiled program compiled from a static language program. The dynamic object is excluded from static analysis during compiling of the compiled program. The dynamic object includes functionality to act as a proxy object that is configured to load a platform specific object at runtime if the platform specific object is accessible on a platform executing the compiled program at runtime. The method further includes testing the proxy object to determine if the platform specific object loaded successfully. As a result of testing, the method includes determining that the platform specific object loaded successfully, and as a result making a call to the platform specific object API.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein use dynamic objects defined in a static language. The dynamic objects may include dependant calls to objects that are present in some platforms, but not present in others. This may be done for a number of different reasons. For example, in some embodiments, some platforms may support certain functionality that is not supported on other platforms. Alternatively, different platforms may support the same functionality, but may use mechanisms in the form of different objects to provide the support. By using dynamic objects within a static language, some embodiments are able to facilitate a single source code/single binary solution, as opposed to a single source code/multiple binary solution. This way, a single binary can be distributed to multiple different platforms, thus reducing the need to create, store and deliver multiple binaries for multiple different platforms.

The dynamic objects are not scrutinized statically at compile time, thus the static language compiler will not cause an error as a result of a dynamic object including code that is not compatible with a given platform, such as a call to a non-existent object. In particular, dynamic languages allow developers to create code which is not scrutinized statically at compile time. Rather, at runtime a program will throw an exception if inappropriate calls are made in the code. Essentially, the developer can code whatever they want without fear of failing a non-runtime compiler error. Thus, embodiments may use dynamic objects in static language code, such that the dynamic objects are not scrutinized during static compiling.

Figure 1A:
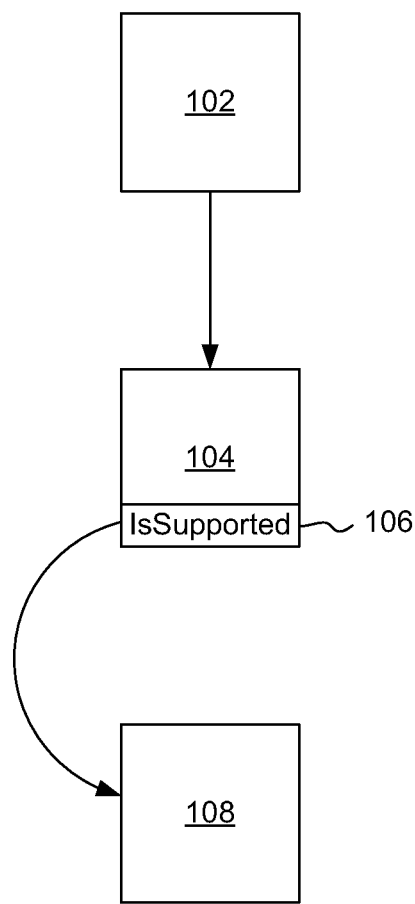
FIG. 1A illustrates an object graph using a proxy object and a method to determine if functionality is supported on a platform.

In the examples illustrated herein, various alternatives are shown. In particular, one embodiment includes an "if supported" method which is only fully run if an object referenced in the "if supported" call is present on the platform which the "if supported" method is called on. The "if supported" method can be used for embodiments to implement functionality available on some platforms and not on others. An example of this is illustrated in FIG. 1A. FIG. 1A illustrates execution of platform portable code in the form of an object map. FIG. 1A illustrates that a first object 102 is called. The first object 102 calls to a proxy object 104 which is a dynamically compiled object within a statically compiled portable code program as explained in more detail below. The proxy object 104 includes an IsSupported method 106. This IsSupported method is a conditional call to another object 108. The call is made only if the other object 108 is available and executable on the platform executing the platform portable code. If the other object 108 is not available, then the proxy object 104 (using the IsSupported method) will act as a gate to determine if it is safe to make calls to the other object, and thus prevent runtime exceptions from being thrown.

Figure 1B:
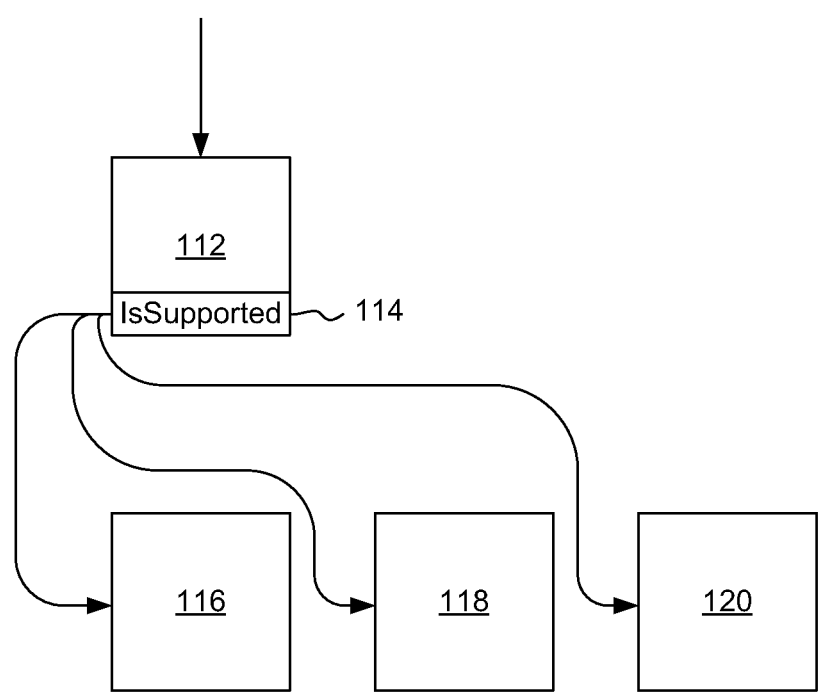
FIG. 1B illustrates an object graph using a proxy object and a method to determine if functionality is supported on a platform for a plurality of different platforms.

Using a plurality of "if supported" methods, embodiments can support different platforms that have similar functionality, but use different mechanisms, such as different objects. An example of this is illustrated in FIG. 1B. FIG. 1B illustrates a first object 110 that calls to a proxy object 112. The proxy object 112 is a dynamic object which is part of platform portable code compiled statically (other than for dynamic objects as explained in detail below). The proxy object 112 includes an IsSupported method 114 which serves as a gate to determine if it is safe to call other methods on the proxy object 112. The IsSupported method may include conditional calls to an objects, such as objects 116, 118, and 120. Each of these objects 116, 118, and 120 may be objects that support similar functionality but on different platforms. The IsSupported method 114 allows a call to the appropriate object for the appropriate platform. This prevents calls to unsupported methods being called on platforms, and thus prevents runtime exceptions.

Figure 1C:
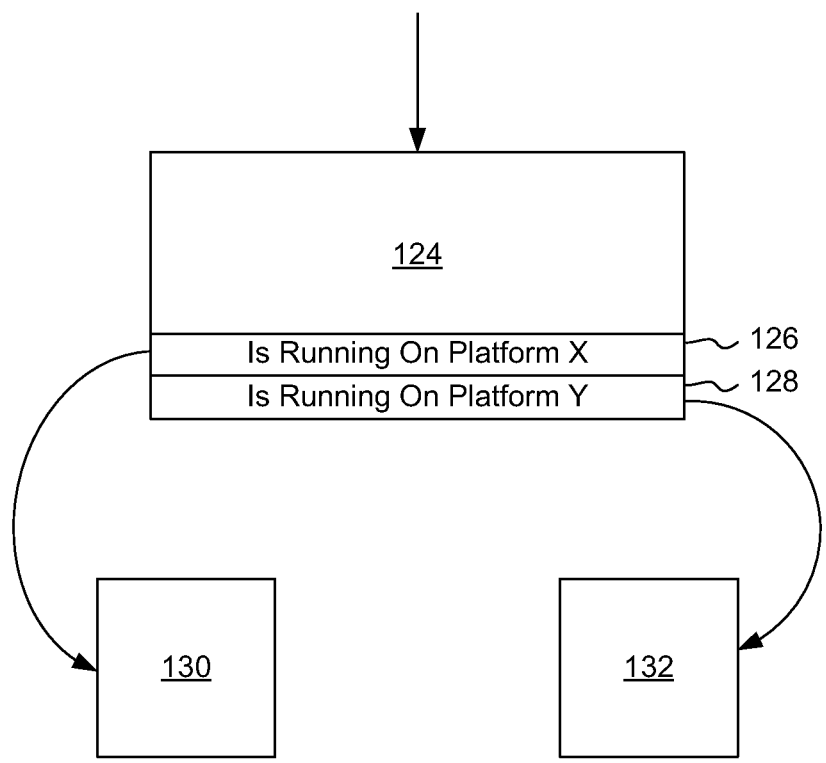
FIG. 1C illustrates an object graph using a proxy object and a method to determine what platform is in use.

In an alternative embodiment, a method may be run which has alternative paths for different frameworks. An example of this is illustrated in FIG. 1C. FIG. 1C illustrates a first method 122. The first method calls to a proxy object 124. The proxy object 124 is a dynamic object which is part of platform portable code compiled statically (other than for dynamic objects as explained in detail below). The proxy object 124 includes two alternative methods, IsRunningOnPlatformX 126 and IsRunningOnPlatformY 128. These methods each include functionality for making calls to objects 130 and 132 respectively depending on which platform the platform portable code is running on.

More detailed examples of these embodiments are now illustrated.

CLR 4.0 for .Net® Framework from Microsoft Corporation of Redmond Wash. includes support for dynamic objects within a static language. In particular, this framework includes a dynamic object type (DynamicObject) that can be used within static languages. Thus, some embodiments use dynamic features of static languages (C# and VB are examples of static languages) to write adaptive code using dynamic invocations. Static languages are typically checked for errors at compile time and error checking is often platform dependent, while dynamic languages check for errors in code right before it is executed. Using dynamic objects within a static language allows developers to call arbitrary APIs at design time that might not exist on some supported platforms without fear of compile time errors.

For example, a first API may exist on a first platform and not a second platform while a second API may exist on the second platform, but not the first platform. Thus, if calls to the first and second APIs are done using dynamic objects implemented within a static language, compiling for the first platform will not result in an error due to a call to the second API and compiling for the second platform will not result in an error due to a cal to the first API. However, at runtime, if the first platform calls the second API, or the second platform calls the first API, a runtime exception will be thrown. Thus, embodiments may implement a specialized type which can prevent calls by a platform to unsupported objects, even though those calls exist in the compiled binary.

One illustrative embodiment includes a special type, which in the present example is a subtype of DynamicObject in CLR 4.0 for .Net® Framework. As noted, DynamicObject is an object in CLR 4.0 that does not get scrutinized by the static compiler. DynamicObject represents a dynamic proxy to an arbitrary API. In the present example, this special type object is referred to herein as LightupDynamicObject (herinafter "LDO"). While "Lightup" intones the ability to light-up a feature when available on a particular platform, the LDO may also be used to implement similar functionality on different platforms using different mechanisms. When an instance of this type is created, the developer provides information describing which platform specific API this LDO represents.

For example, the following illustrates an example, similar to that shown in FIG. 1A, of an LDO using speech synthesizer functionality. Notably, for purposes of illustration, speech synthesizer APIs are present on .NET® Framework available from Microsoft Corporation of Redmond Wash., but not in Silverlight® also available from Microsoft Corporation. Thus, these two platforms can be used to illustrate how the LDO is used in various platforms and how the LDO can be used to light-up speech functionality when available. The following code creates an instance of LDO representing speech synthesizer APIs:
dynamic speech=new LightupDynamicObject("System.Speech.SpeechSynthetizer,System.Speech");

This passes a string to a constructor that includes the name of a type ("System.Speech.SpeechSynthetizer") and a dll ("System.Speech"). Now, the speech object can be used as follows (even in programs that run on platforms that do not support speech, such as Silverlight®):

```
if(speech.IsSupported){
    speech.Speak("Hi!");
}
```

IsSupported is a method of LDO, and is used to determine if speech APIs are supported on the platform on which the speech object is used. The call to "Speak" is a dynamic call, and so it does not fail at compile time or at load time, as it would if the call was not dynamic.

As noted, in the illustrated example of LDO, LDO includes a dynamic member called "IsSupported" to the instance. The member allows the code to query whether the platform supports the API indicated during construction. Without the "if" check the call to Speak may fail at runtime on some platforms.

While the preceding example shows how a dynamic member is protected from runtime exceptions by preventing the dynamic member from being called on platforms that do not support the member, similar functionality can be achieved with static members. For example, the following illustrates a proxy call, using the LDO to a static member.
dynamic console=new LightupDynamicObject("System.Console,mscorlib");
if(console.IsSupported) console.WriteLine("Hi!");

In the preceding example, "WriteLine" is a static member.
"IsSupported" (or methods with similar functionality in other embodiments) can also be used to support platforms with similar functionality, but implemented using different mechanisms, as illustrated in FIG. 1B. For example, different platforms may all include initialization functionality, but may implement the initialization functionality using different APIs. The following example illustrates this functionality on fictional platforms X and Y, and platform initialization methods for each of the platforms:

```
dynamic platInitX = new LightupDynamicObject("TypeOnPlatformX,
AssemblyOnPlatformX");
if (platInitX.IsSupported)
{
    platInitX.PlatformXSpecificMethodCall(...);
}
dynamic platInitY = new LightupDynamicObject("TypeOnPlatformY,
AssemblyOnPlatformY");
if (platInitY.IsSupported)
{
    platInitY.PlaformYSpecificMethodCall(...);
}
```

While the preceding examples have illustrated using a method to determine if APIs are supported for a platform and then to execute the APIs, other embodiments may use methods which allow for alternative calls, such as is illustrated in FIG. 1C above. For example, the method may be able to specifically identify which platform the binary is running on and then call the appropriate API. The following illustrates an example using a method which allows for alternative method calls for different platforms. In particular, the following example illustrates this functionality on fictional platforms X and Y, and platform initialization methods for each of the platforms.

```
dynamic platInit = new AdaptiveDynamicObject( );
platInit.RegisterPlatform("X", "TypeOnPlatformX,
AssemblyOnPlatformX");
platInit.RegisterPlatform("Y", "TypeOnPlatformY,
AssemblyOnPlatformY");
if (platInit.IsRunningOnPlatformX)
{
    platInit.PlatformXSpecificMethodCall(...);
}
else if (platInit.IsRunningOnPlatformY)
{
    platInit.PlaformYSpecificMethodCall(...);
}
```

In the preceding example, a determination is made as to which platform the binary is being executed on. If platform X is executing the binary, then platInit.PlatformXSpecificMethodCall( . . . ) is called. If platform Y is executing the binary, then platInit.PlatformYSpecificMethodCall( . . . ) is called.

Some embodiments are useful in that they allow for adaptive code calling an arbitrary API, whereas previous solutions require the platform specific API to be specifically designed for adaptive code. Further, some embodiments allow for adaptive binaries in statically types languages with strong load time verification, such as CLR or Java VM.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
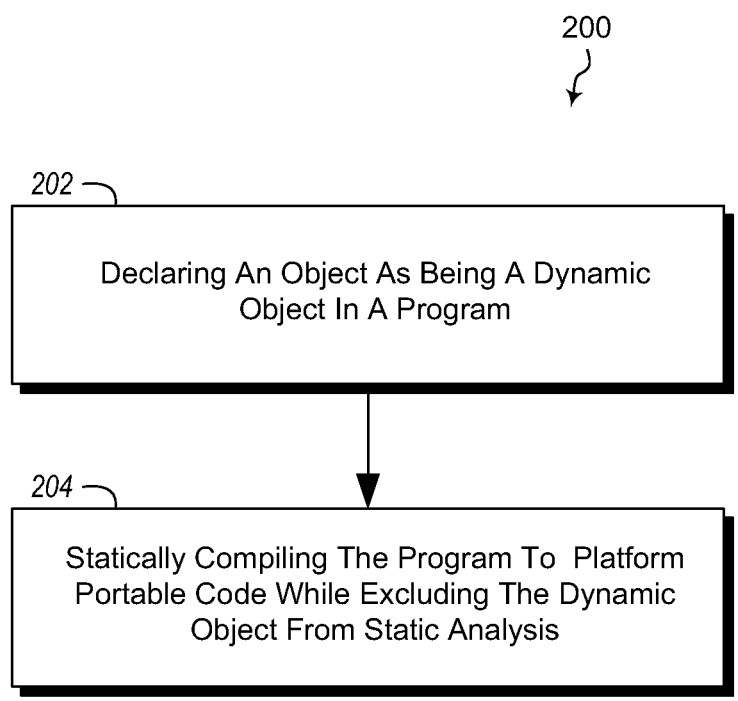
FIG. 2 illustrates a method of creating platform portable code.

Referring now to FIG. 2, a method 200 is illustrated. The method may be practiced in a computing environment including a statically compiled language. The statically compiled language makes provisions for dynamically compiled elements. The method includes acts for creating platform portable code. The method includes declaring an object as being a dynamic object in a program (act 202). The program is a program compiled using a static language. Declaring the object as being a dynamic object causes the object declared as being a dynamic object to be excluded from static analysis on the object when the program is compiled. The dynamic object includes a dependent call to a platform specific API. The platform specific API is available on one or more platforms to which a compiled version of the program will be deployed, but not available on one or more other platforms to which the compiled version of the program will be deployed.

The method 200 further includes statically compiling the program to platform portable code while excluding the dynamic object from static analysis (act 204). The platform portable code is then deployed to and successfully executed on different platforms. As noted statically compiling the program to platform portable code includes specifically excluding the dynamic object, as a result of the object being declared as a dynamic object, from static analysis performed on other objects not declared as dynamic in the program during compiling.

Embodiments of the method 200 may be practiced where the dependent call to a platform specific API is dependent on a method of the dynamic object included in the compiled program determining that the platform specific API is supported. For example, FIGS. 1A and 1B and other examples illustrated above, illustrate use of the IsSupported methods 106 and 114 which can be used to determine if a particular functionality, object, and/or API is supported on a platform. The call to a platform specific API is dependent on the results of determining whether or not the API is supported.

In an alternative embodiments of the method 200, the method 200 may be practiced where the dependent call to a platform specific API is dependent on a method of the dynamic object included in the compiled program determining the platform on which the compiled program is executing. For example, as illustrated in FIG. 1C and other embodiments described above, methods 126 and 128 may be used to determine what platform is being used and based on the platform being used, an appropriate call to a platform specific API may be made.

Embodiments of the method 200 may be practiced where the method creates platform portable code that is platform portable binary code. In this embodiment, a single binary is created from a single source code program, as opposed to single source/multiple binary solutions. The single binary is distributable to a plurality of different platforms. As noted above, different platforms may include platforms with different operating systems; different platforms may include platforms with different versions of operating systems; different virtual machines (e.g. desktop CLR vs Silverlight® runtime vs. mobile phone runtime, etc.), different devices; and/or differences in environments or underlying systems where software is run, such as for example differences in hardware or software configurations.

Embodiments of the method 200 may be practiced where the dependent call to a platform specific API facilitates light-up functionality enabling functionality on one or more platform to which the compiled program is deployed that does not exist on one or more other platforms to which the compiled program is deployed. An example of this is illustrated above where speech functionality is available on some platforms but not others. A test can be made for support, and when supported, the speech functionality is lit-up.

Embodiments of the method 200 may be practiced where the dependent call to a platform specific API facilitates using alternative mechanisms to implement similar functionality on different platforms to which the compiled program is deployed, where each platform has similar functionality, but uses different APIs to implement the functionality. Examples of this are illustrated in FIGS. 1B and 1C and other examples illustrated above.

Figure 3:
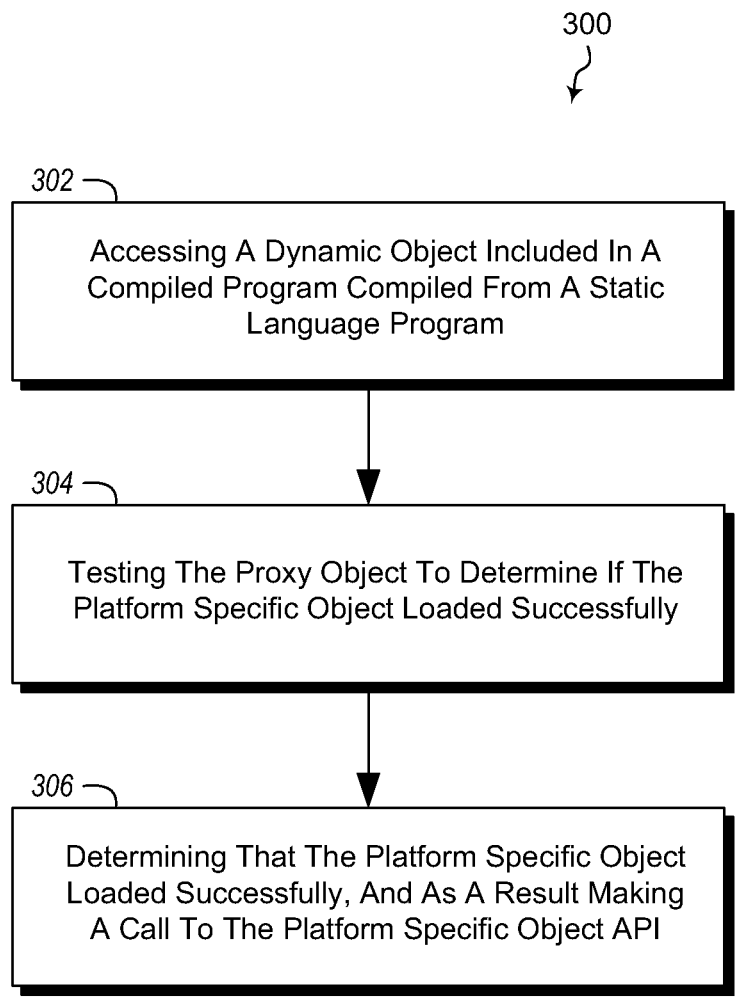
FIG. 3 illustrates a method of executing platform portable code.

Referring now to FIG. 3, a method 300 is illustrated. The method 300 may be practiced in a computing environment including a statically compiled language. The statically compiled language makes provisions for dynamically compiled elements. The method includes acts for executing platform portable code. The method includes accessing a dynamic object included in a compiled program compiled from a static language program (act 302). The dynamic object was excluded from static analysis during compiling of the compiled program. The dynamic object comprises functionality to act as a proxy object that is configured to load a platform specific object at runtime if the platform specific object is accessible on a platform executing the compiled program at runtime.

The method further includes testing the proxy object to determine if the platform specific object loaded successfully (act 304). Embodiments may be practiced where testing the proxy object to determine if the platform specific object loaded successfully includes a method of the dynamic object included in the compiled program determining that the platform specific object is supported. For example, FIGS. 1A and 1B illustrate the use of an IsSupported method to determine if a platform specific object is supported. Alternatively, embodiments may be practiced where testing the proxy object to determine if the platform specific object loaded successfully comprises a method of the dynamic object included in the compiled program determining the platform on which the compiled program is executing. For example, FIG. 1C illustrates methods that determine on which platform the dynamic object is executing.

The method 300 further includes, as a result of testing the proxy object, determining that the platform specific object loaded successfully, and as a result making a call to the platform specific object API (act 306).

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language or Microsoft Intermediate Language®, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a static language program written using a statically compiled language wherein the statically compiled language makes provisions for dynamically compiled elements, including dependent calls to platform specific programming interfaces enabling platform-specific code translation, using a dynamic binding mechanism at a target platform, into a deployable platform executable to carry out an intended application functionality on a target platform among a plurality of target platforms, the target platform being the platform to which the compiled executable program is to be deployed but does not exist on one or more other platforms to which the compiled executable program is to be deployed and in which the statically compiled program is translated into its finalized form by invoking the dependent calls pertinent to the native resources of the target platform, a method of creating platform portable code, the method comprising:

declaring a portion of code defined in a static language program, prior to the static language program being compiled, as being a dynamic object, the portion of code being targeted for a target platform configured to execute the portion of code as defined in the static language program prior to compiling the static language program, the static language program being a program compiled using a static language, wherein declaring the portion of code as being a dynamic object prevents exceptions from being thrown due to the dynamic object based on static analysis when the static language program is compiled, wherein the dynamic object comprises a dependent call to a platform specific programming interface implemented in the target platform, the platform specific programming interface being available on the target platform, but not available on one or more other platforms to which the compiled version of the static language program will be deployed; and statically compiling the static language program to platform portable code that is then deployed to and successfully executed on different platforms and where when the portable code is deployed to the target platform, the target platform is able to execute the portion of code declared as being a dynamic object, wherein statically compiling the static language program to platform portable code comprises leaving the portion of code declared as a dynamic object as dynamic code to be interpreted by the target platform to call the platform specific programming interface of the target platform.

2. The method of claim 1, wherein the dependent call to a platform specific programming interface is dependent on a method of the dynamic object included in the compiled program determining that the platform specific programming interface is supported.

3. The method of claim 1, wherein the dependent call to a platform specific programming interface is dependent on method of the dynamic object included in the compiled program determining the platform on which the compiled program is executing.

4. The method of claim 1, wherein the method creates platform portable code that is platform portable binary code, such that a single binary is created from a single source code program comprising one or more source code files, where the single binary is distributable to a plurality of different platforms.

5. The method of claim 1, wherein the dependent call to a platform specific programming interface facilitates light-up functionality enabling functionality on one or more platform to which the compiled program is deployed that does not exist on one or more other platforms to which the compiled program is deployed.

6. The method of claim 1, wherein the dependent call to a platform specific programming interface facilitates using alternative mechanisms to implement similar functionality on different platforms to which the compiled program is deployed, where each platform has similar functionality, but uses different programming interfaces to implement the functionality.

7. The method of claim 1, wherein the different platforms comprise platforms with different operating systems.

8. The method of claim 1, wherein the different platforms comprise platforms with different versions of operating systems.

9. The method of claim 1, wherein the different platforms comprise platforms with at least one of different hardware or software configurations.

10. The method of claim 1, wherein the different platforms comprise platforms having a different virtual machine.

11. In a computing environment comprising a statically compiled language wherein the statically compiled language makes provisions for dynamically compiled elements, including dependent calls to platform specific programming interfaces enabling platform-specific code translation, using a dynamic binding mechanism at a target platform, into a deployable platform executable to carry out an intended application functionality on a target platform among a plurality of target platforms, the target platform being the platform to which the compiled executable program is to be deployed but does not exist on one or more other platforms to which the compiled executable program is to be deployed and in which the statically compiled program is translated into its finalized form by invoking the dependent calls pertinent to the native resources of the target platform, a method of executing platform portable code, the method comprising:

accessing a portion of code, configured to be executed on a target platform, declared as a dynamic object included in a compiled program compiled from a static language program, wherein the portion of code was included in the compiled program before the static language program was compiled, but wherein the portion of code was excluded from static analysis during compiling of the compiled program, preventing exceptions from being thrown due to the dynamic object based on static analysis when the static language program is compiled, as a result of the portion of code being declared as a dynamic object in the static language program such that the portion of code remains as declared prior to the static language program being compiled such that the portion of code remains interpretable by the target platform before and after the static language program is compiled, leaving the portion of code declared as a dynamic object as dynamic code to be interpreted by the target platform to call the platform specific programming interface of the target platform, such that when the portable code is deployed to the target platform, the target platform is able to execute the portion of code declared as being a dynamic object, and wherein the portion of code comprises functionality to act as a proxy object that is configured to load a platform specific object at runtime if the platform specific object is accessible on a platform executing the compiled program at runtime;

testing the proxy object to determine if the platform specific object loaded successfully; and determining that the platform specific object loaded successfully, and as a result making a call to the platform specific object programming interface.

12. The method of claim 11, wherein testing the proxy object to determine if the platform specific object loaded successfully comprises a method of the dynamic object included in the compiled program determining that the platform specific object is supported.

13. The method of claim 11, wherein testing the proxy object to determine if the platform specific object loaded successfully comprises a method of the dynamic object included in the compiled program determining the platform on which the compiled program is executing.

14. The method of claim 11, wherein compiled program is platform portable binary code and is a single binary created from a single source code program, where the single binary is distributable to a plurality of different platforms.

15. The method of claim 11, wherein making a call to the platform specific object API facilitates light-up functionality enabling functionality on one or more platform to which the compiled program is deployed that does not exist on one or more other platforms to which the compiled program is deployed.

16. The method of claim 11, wherein making a call to the platform specific object programming interface facilitates using alternative mechanisms to implement similar functionality on different platforms to which the compiled program is deployed, where each platform has similar functionality, but uses different programming interfaces to implement the functionality.

17. In a computing environment comprising a statically compiled language wherein the statically compiled language makes provisions for dynamically compiled elements, including dependent calls to platform specific programming interfaces enabling platform-specific code translation, using a dynamic binding mechanism at a target platform, into a deployable platform executable to carry out an intended application functionality on a target platform among a plurality of target platforms, the target platform being the platform to which the compiled executable program is to be deployed but does not exist on one or more other platforms to which the compiled executable program is to be deployed and in which the statically compiled program is translated into its finalized form by invoking the dependent calls pertinent to the native resources of the target platform, a method of executing platform portable code, the method comprising:

accessing a portion of code, configured to be executed on a target platform, declared as a dynamic object included in a compiled program compiled from a static language program, wherein the portion of code was included in the compiled program before the static language program was compiled, but wherein the portion of code was excluded from static analysis during compiling of the compiled program, preventing exceptions from being thrown due to the dynamic object based on static analysis when the static language program is compiled, as a result of the dynamic object being declared as a dynamic object in the static language program such that the portion of code remains as declared prior to the static language program being compiled such that the portion of code remains interpretable by the target platform before and after the static language program is compiled, leaving the portion of code declared as a dynamic object as dynamic code to be interpreted by the target platform to call the platform specific programming interface of the target platform such that when the portable code is deployed to the target platform, the target platform is able to execute the portion of code declared as being a dynamic object, and wherein the portion of code comprises a dependent call to a platform specific programming interface, the platform specific programming interface being available on one or more platforms to which the compiled program will be deployed, including the target platform, but not available on one or more other platforms to which the compiled program will be deployed, and wherein the dependent call to a platform specific programming interface will fail at runtime on some platforms to which the compiled program will be deployed;

testing the dynamic object to determine if the platform specific programming interface is supported on a platform presently executing the compiled program; and determining that the platform specific programming interface is supported on the platform presently executing the compiled program, and as a result making a call to the platform specific programming interface.

18. The method of claim 17, wherein testing the dynamic object to determine if the platform specific programming interface is supported on a platform presently executing the compiled program comprises a method of the dynamic object included in the compiled program determining that the platform specific API is supported.

19. The method of claim 17, wherein testing the dynamic object to determine if the platform specific programming interface is supported on a platform presently executing the compiled program comprises a method of the dynamic object included in the compiled program determining the platform on which the compiled program is executing.

20. The method of claim 17, wherein compiled program is platform portable binary code and is a single binary created from a single source code program, where the single binary is distributable to a plurality of different platforms.

* * * * *